United States Patent
Axelrod

(10) Patent No.: US 7,691,424 B2
(45) Date of Patent: Apr. 6, 2010

(54) NUTRITIONAL SUPPLEMENT

(75) Inventor: Glen S. Axelrod, Colts Neck, NJ (US)

(73) Assignee: T.F.H. Pulications, Inc., Neptune City, NJ (US)

( * ) Notice: Subject to any disclaimer, the term of this patent is extended or adjusted under 35 U.S.C. 154(b) by 917 days.

(21) Appl. No.: 11/261,456

(22) Filed: Oct. 28, 2005

(65) Prior Publication Data

US 2007/0098840 A1    May 3, 2007

(51) Int. Cl.
*A23K 1/18* (2006.01)

(52) U.S. Cl. .................. 426/2; 426/72; 426/74; 426/614; 426/656; 426/658; 426/805

(58) Field of Classification Search .............. 426/2, 426/74, 614, 656, 658, 805, 72
See application file for complete search history.

(56) References Cited

U.S. PATENT DOCUMENTS

| | | | | |
|---|---|---|---|---|
| 2,332,802 | A | * | 10/1943 | Leonardson et al. ........ 524/797 |
| 2,912,332 | A | * | 11/1959 | Ramseyer, Jr. et al. ........ 426/72 |
| 2,950,204 | A | * | 8/1960 | Peebles ................... 426/285 |
| 3,256,093 | A | * | 6/1966 | Hinton et al. .............. 426/104 |
| 3,539,450 | A | * | 11/1970 | Deutsch ................... 435/188 |
| 3,962,462 | A | | 6/1976 | Burkwall, Jr. et al. |
| 3,974,296 | A | | 8/1976 | Burkwall, Jr. ............. 426/104 |
| 4,076,852 | A | | 2/1978 | Van Delft et al. ........... 426/533 |
| 4,182,655 | A | * | 1/1980 | Hartmeier ................. 435/181 |
| 4,364,925 | A | * | 12/1982 | Fisher ...................... 424/50 |
| 4,804,549 | A | | 2/1989 | Howley et al. ............... 426/98 |
| 4,873,096 | A | | 10/1989 | Spiel et al. ................. 426/72 |
| 5,149,562 | A | * | 9/1992 | Hebert et al. ............... 426/632 |
| 5,200,212 | A | | 4/1993 | Axelrod ...................... 426/2 |
| 5,240,720 | A | | 8/1993 | Axelrod ...................... 426/2 |
| 5,310,541 | A | * | 5/1994 | Montgomery .................. 424/50 |
| 5,401,518 | A | * | 3/1995 | Adams et al. ................ 426/89 |
| 5,476,069 | A | | 12/1995 | Axelrod .................... 119/709 |
| 5,532,010 | A | * | 7/1996 | Spanier et al. ............... 426/94 |
| 5,731,019 | A | * | 3/1998 | Schafer et al. ............... 426/99 |
| 5,827,565 | A | | 10/1998 | Axelrod .................... 426/623 |
| 5,941,197 | A | | 8/1999 | Axelrod .................... 119/710 |
| 6,056,991 | A | | 5/2000 | Axelrod .................... 426/644 |
| 6,086,940 | A | | 7/2000 | Axelrod .................... 426/623 |
| 6,093,427 | A | | 7/2000 | Axelrod .................... 426/104 |
| 6,093,441 | A | | 7/2000 | Axelrod .................... 426/632 |
| 6,110,521 | A | | 8/2000 | Axelrod .................... 426/549 |
| 6,126,978 | A | | 10/2000 | Axelrod .................... 426/285 |
| 6,159,516 | A | | 12/2000 | Axelrod et al. .............. 426/456 |
| 6,180,161 | B1 | | 1/2001 | Axelrod .................... 426/623 |
| 6,200,616 | B1 | | 3/2001 | Axelrod et al. .............. 426/285 |
| 6,228,418 | B1 | * | 5/2001 | Gluck et al. ................ 426/623 |
| 6,254,920 | B1 | | 7/2001 | Brunner | |
| 6,274,182 | B1 | | 8/2001 | Axelrod et al. .............. 426/132 |
| 6,294,365 | B1 | * | 9/2001 | De Rosier et al. ........... 435/188 |
| 6,379,725 | B1 | * | 4/2002 | Wang et al. ................. 426/72 |
| 6,455,083 | B1 | * | 9/2002 | Wang ...................... 426/104 |
| 6,495,177 | B1 | * | 12/2002 | deVries et al. ............... 426/72 |
| 6,528,067 | B1 | * | 3/2003 | Magdassi et al. ............ 424/439 |
| 6,576,246 | B1 | | 6/2003 | Denesuk et al. ............. 424/400 |
| 6,586,027 | B2 | | 7/2003 | Axelrod et al. .............. 426/132 |
| 6,821,538 | B2 | | 11/2004 | Axelrod et al. .............. 426/132 |
| 6,916,497 | B2 | | 7/2005 | Axelrod et al. .............. 426/132 |
| 6,946,488 | B2 | | 9/2005 | Hayek et al. | |
| 7,244,460 | B2 | * | 7/2007 | Lee et al. .................. 426/302 |
| 2003/0104102 | A1 | | 6/2003 | Nelles et al. | |

FOREIGN PATENT DOCUMENTS

WO    WO 9707814 A1 *  3/1997

OTHER PUBLICATIONS

"Biofoods" brochure, downloaded from archived pages of website http://www.biofoodsltd.com/Soynatto.htm, Jun. 4, 2002, 10 pages.*
Iams, "Iams Savory Sauce Country Style Chicken Flavor," dated Jul. 27, 2005 (2 pages).
Iams, "Iams Savory Sauce Sizzlin' Bacon Flavor Active Maturity," dated Jul. 27, 2005 (2 pages).
Iams, "Iams Savory Sauce Roasted Beef Flavor," dated Jul. 27, 2005 (2 pages).

* cited by examiner

*Primary Examiner*—C. Sayala
(74) *Attorney, Agent, or Firm*—Grossman, Tucker, Perreault & Pfleger, PLLC

(57) ABSTRACT

The present invention relates to a nutritional supplement including an albumin carrier for an additive. The nutritional supplement may be dispersed on food substrates as a coating or may be combined into food substrate and formed into a desired shape.

10 Claims, No Drawings

NUTRITIONAL SUPPLEMENT

FIELD OF INVENTION

The present invention relates to a nutritional supplement including an albumin carrier for an additive. The nutritional supplement may be dispersed on or into, e.g., an animal or bird food substrate.

BACKGROUND

Numerous disclosures exist pertaining to the development of edible animal foods, chews or treats that are digestible and/or nutritious along with a texture that can be individually adjusted to suit a wide variety of a dog's preferences or needs. Furthermore, numerous disclosures exist pertaining to the incorporation of additives to increase the attractiveness of the edible foods, chews or treats to the animal. Attention is therefore directed to the following exemplary disclosures: "Health Chew Toy" U.S. Pat. No. 6,916,497; "Blends of Starch and Aliphatic-Aromatic Based Polyester Resins" U.S. Pat. No. 6,821,538, "Health Chew Toy" U.S. Pat. No. 6,586,027; "Animal Chew" U.S. Pat. No. 6,274,182; "Animal Chew" U.S. Pat. No. 6,200,616; "Heat Modifiable Edible Dog Chew" U.S. Pat. No. 6,180,161; "Method of Molding Edible Starch" U.S. Pat. No. 6,159,516; "Edible Dog Chew" U.S. Pat. No. 6,126,978; "Wheat and Casein Dog Chew with Modifiable Texture" U.S. Pat. No. 6,110,521; "Heat Modifiable Peanut Dog Chew" U.S. Pat. No. 6,093,441; "Vegetable-Based Dog Chew" U.S. Pat. No. 6,093,427; "High Starch Content Dog Chew" U.S. Pat. No. 6,086,940; "Turkey and Rice Dog Chew with Modifiable Texture" U.S. Pat. No. 6,056,991; "Carrot-Based Dog Chew" U.S. Pat. No. 5,941,197; "Process for Making an Edible Dog Chew" U.S. Pat. No. 5,827,565; "Molded Rawhide Chew Toy" U.S. Pat. No. 5,476,069; "Dog Chew with Modifiable Texture" U.S. Pat. No. 5,240,720; "Dog Chew with Modifiable Texture" U.S. Pat. No. 5,200,212, etc.

SUMMARY

An aspect of the present invention relates to a nutritional supplement comprising albumin and an additive combined with the albumin. Another aspect relates to providing a nutritional supplement including albumin and an additive and combining the nutritional supplement with a resin composition. The resin composition and nutritional supplement may then be formed into a desired shape.

DETAILED DESCRIPTION

The present invention relates to a nutritional supplement including an albumin carrier for additives. For example, the albumin may be coated on or combined with a bird or animal food substrate. A food substrate is a reference to, e.g., feed, seed, food, chews or treats. The nutritional supplement may include additives such as flavorants, attractants, minerals, vitamins, herbs, fatty acids, fermented soy nutraceutical, yeast products enzymes/coenzymes and other products.

Albumin may be understood herein to be any heat-coagulable water-soluble protein that may occur in blood plasma or serum, muscle, the whites of eggs, milk, and other animal substances and in many plant tissues and fluids. Accordingly, the albumin may be used to increase protein content and, in some instances, may include little to no fat content. The albumin may be provided in either powdered or liquid form. The albumin may be present between 1-99% of the nutritional supplement and all increments and values therein.

Examples of flavorants and/or attractants that may be dispersed in the nutritional supplement include animal or fish meal, digests, products or by-products. By meal it is meant to include the clean, dried, ground or rendered tissue of undecomposed animal or fish. By digests it is meant to include a substance made by taking relatively clean and relatively undecomposed animal tissue and breaking it down utilizing chemical or enzymatic hydrolysis. The animal digest may be hydrolyzed liver, e.g., hydrolyzed beef or poultry liver. In addition, the animal meal or digests may not contain hair, horn, teeth, hooves or feathers, which may be present in unavoidable trace amounts. Animal digests may be obtained from Applied Food Biotechnology Incorporated, O' Fallon, Mo., and sold under the trade name Optimizor®. Fruit matter, vegetable matter, nuts, nut bits, nut flour, etc. may also be incorporated as a flavorant and/or an attractant. The flavorants and/or attractants may be incorporated into the nutritional supplement individually or in combination between 0.1-50% by weight and any incremental value or ranges therebetween.

Fermented soy nutraceutical and/or enzymes and coenzymes may also be incorporated into the albumin. The fermented soy nutraceutical may be incorporated into the nutritional supplement between 0.01-50% by weight and any incremental value or range there between. Fermented soya nutraceuticals are available from Bio Food, Ltd., Pine Brook, N.J. and sold under the general trademark Soynatto®. The Soynatto® product is more specifically described to contain the following as compared to other available compositions:

| | Made With | | Foods* | | | | Constituants* | | |
|---|---|---|---|---|---|---|---|---|---|
| Nutrient | Units per 100 g | IEFS | Soynatto ® | Tempeh | Miso Paste | Soy protein isolate | Soy milk as fluid | Tofu, regular |
| | | | Proximates | | | | | | |
| Protein | g | 37.00 | 37.00 | 18.54 | 11.81 | 80.69 | 2.75 | 8.08 |
| Total lipid | g | 7.50 | 7.50 | 10.80 | 6.07 | 3.39 | 1.91 | 4.78 |
| Carbohydrate | g | 40.00 | 40.00 | 9.39 | 27.96 | 7.36 | 1.81 | 1.88 |
| Fiber, total dietary | g | 12.02 | 12.02 | | 5.40 | 5.60 | 1.30 | 0.30 |
| | | | Minerals | | | | | | |
| Calcium | mg | 151.50 | 151.50 | 111.00 | 66.00 | 178.00 | 4.00 | 350.00 |
| Iron | mg | 5.21 | 5.21 | 2.70 | 2.74 | 14.50 | 0.58 | 5.36 |
| Magnesium | mg | 191.25 | 191.25 | 81.00 | 42.00 | 39.00 | 19.00 | 30.00 |
| Phosphorus | mg | 608.25 | 608.25 | 266.00 | 153.00 | 776.00 | 49.00 | 97.00 |
| Potassium | mg | 1957.50 | 1957.50 | 412.00 | 164.00 | 81.00 | 141.00 | 121.00 |

-continued

| Nutrient | Made With Units per 100 g | Foods* IEFS | Soynatto ® | Tempeh | Miso Paste | Constituents* Soy protein isolate | Soy milk as fluid | Tofu, regular |
|---|---|---|---|---|---|---|---|---|
| Sodium | mg | 18.30 | 18.30 | 9.00 | 3647.00 | 1005.00 | 12.00 | 7.00 |
| Zinc | mg | 3.84 | 3.84 | 1.14 | 3.32 | 4.03 | 0.23 | 0.80 |
| Copper | mg | 3.93 | 3.93 | 0.56 | 0.44 | 1.60 | 0.12 | 0.19 |
| Manganese | mg | 2.40 | 2.40 | 1.30 | 0.86 | 1.49 | 0.17 | 0.61 |
| Selenium | mcg | 27.98 | 27.98 | 0.02 | 1.60 | 0.80 | 1.30 | 8.90 |
| Lithium | mcg | 60.00 | 60.00 | tr | tr | tr | tr | tr |
| Molybdenum | mcg | 6.00 | 6.00 | tr | tr | tr | tr | tr |
| Nickel | mcg | 30.00 | 30.00 | tr | tr | tr | tr | tr |
| Tin | mcg | 12.00 | 12.00 | tr | tr | tr | tr | tr |
| Lipids | | | | | | | | |
| Fatty acids, saturated | g | 1.22 | 1.22 | 2.22 | 0.88 | 0.42 | 0.21 | 0.69 |
| Fatty acids, monounsaturated | g | 1.70 | 1.70 | 3.00 | 1.34 | 0.65 | 0.33 | 1.06 |
| Fatty acids, polyunsaturated | g | 4.14 | 4.14 | 3.83 | 3.43 | 1.65 | 0.83 | 2.70 |
| Omega-6 Fatty Acid | g | 3.57 | 3.57 | 3.59 | 3.02 | 1.45 | 0.74 | 2.38 |
| Omega-3 Fatty Acid | g | 0.55 | 0.55 | 0.22 | 0.41 | 0.20 | 0.10 | 0.32 |
| Vitamins | | | | | | | | |
| Thiamin | mg | 1.79 | 1.79 | 0.08 | 0.10 | 0.18 | 0.16 | 0.08 |
| Riboflavin | mg | 1.04 | 1.04 | 0.36 | 0.25 | 0.10 | 0.07 | 0.05 |
| Niacin | mg | 7.62 | 7.62 | 2.64 | 0.86 | 1.44 | 0.15 | 0.20 |
| Pantothenic acid | mg | 2.34 | 2.34 | 0.28 | 0.26 | 0.06 | 0.05 | 0.07 |
| Vitamin B-6 | mg | 0.99 | 0.99 | 0.22 | 0.22 | 0.10 | 0.04 | 0.05 |
| Folic | mcg | 532.50 | 532.50 | 23.90 | 33.00 | 176.10 | 1.50 | 15.00 |
| Vitamin A | IU | 30.00 | 30.00 | 0.00 | 87.00 | 0.00 | 32.00 | 85.00 |
| Vitamin E | mg_ATE | 0.15 | 0.15 | tr | 0.01 | 0.00 | 0.01 | tr |
| Biotin | mg | 0.02 | 0.02 | tr | tr | tr | tr | tr |
| Choline | mg | 60.00 | 60.00 | tr | tr | tr | tr | tr |
| Inositol | mg | 72.00 | 72.00 | tr | tr | tr | tr | tr |
| PABA | mg | 6.00 | 6.00 | tr | tr | tr | tr | tr |
| Special Nutrients | | | | | | | | |
| Isoflavones | mg | 4000.00 | 200.00 | 43.52 | 42.55 | 97.43 | 9.65 | 23.61 |
| Glycogen | g | 1.10 | 1.10 | tr | tr | tr | tr | tr |
| Beta Glucans | g | 0.50 | 0.50 | tr | tr | tr | tr | tr |
| Glutathione | mg | 60.00 | 60.00 | tr | tr | tr | tr | tr |
| SOD | unit | 1650.00 | 1650.00 | tr | tr | tr | tr | tr |
| RNA/DNA | g | 1.05 | 1.05 | | | | | |

An Empty Cell indicates a value is un-known;
"tr" indicates a value is probably a trace or none As can be seen from the above, the Soynatto® product may provide proteins, minerals, and vitamins, in a fermented soy form. The fermentation process may infuse the product with *saccharomyces cerevisiae*, commonly known as "bakers yeast" or "brewers yeast." *Saccharomyces cerevisiae* is more traditionally known to ferment sugars present in flour or dough, yielding carbon dioxide and alcohol. Accordingly, it should be appreciated that a protein, one or more of a mineral, and one or more of a vitamin, along with *saccharomyces cerevisiae* may be present in the nutritional supplement.

The fermented soy product herein may include increased concentrations of glycitein, daidzein and genistein, reportedly present at several hundred percent more than other more common soyfood sources. Glycitein, daidzein and genistein belong to the isofavone class of flavanoids and may be classified as phytoestrogen, since they are plant derived nonsteriodal compounds that contain estrogen-like biological activity.

An enzyme and/or co-enzyme which are similarly available through Bio Foods, Ltd., Pine Brook, N.J. and sold under the trademark of BT-CoQ10® may also be included in the nutritional supplement. This reportedly is a biologically transformed (fermented) cell mitochondrial coenzyme and contains Coenzyme Q10, antioxidants, phytonetrients and cofactor mineral nutrients and other.cell constituents. The enzymes and/or co-enzymes may be incorporated into the albumin between 0.01-10% by weight and any incremental value or range therebetween.

Reportedly, the coenzyme Q10 is a fat-soluble compound primarily synthesized by the body and also consumed in the diet and is required for mitochondrial ATP synthesis. The fermented coenzyme also reportedly belongs to the family of compounds known as ubiquinones, which are either of two isomeric cyclic crystalline compounds $C_6H_4O_2$ that are di-keto derivatives of dihydro-benzene. It may also function as an antioxidant in cell membranes and lipoproteins.

A yeast product may also be incorporated into the nutritional supplement and may include for example, nutritional yeast or brewers yeast such as *saccharomyces cerevisiae*, dairy yeast such as *kluyveromyce marxianus* or wine yeast such as saccharomyces fermentati. The yeast may be in a powdered, flake or tablet form prior to addition to the albumin. The brewers yeast, or *saccharomyces cerevisiae*, are believed rich in B-complex vitamins and other nutrients. The yeast products may be incorporated into the nutritional supplement between 0.1-10% by weight and any incremental value or range therebetween.

Vitamins that may be incorporated into the nutritional supplement may include A, C, $B_6$, $B_{12}$, D, E and K, thiamine, riboflavin, panthothenic acid, niacin, inositol, pyridoxine, folic acid, biotin, choline and para-aminobenzoic acid (PABA). Minerals that may be incorporated into the albumin may include calcium, calcium carbonate, calcium chloride, dicalcium phosphate, iron carbonate, phosphorus, potassium, potassium chloride, sodium, sodium selenite, sodium molybdate, chloride, magnesium, magnesium oxide, iron, copper, copper oxide, manganese, zinc, zinc oxide, iodine and selenium. However, it is to be noted that other trace minerals may also be included, such as Co, Mo, Cd, As, Si, V, Ni, Pb and Sn.

Turning next to the herbal component, the herbs herein may be selected from the group consisting of St. John's Wort, kava kava, ginkgo biloba, ginseng (Asian or Siberian varieties), echinacea and mixtures thereof. Other herbs include catsclaw, chamomile, goldenseal, saw palmetto, valerian, vitex agnus-castus, black cohosh, bilberry and milk thistle. Herbs may also include aloe, astragalus, burdock, chestnut, chlorophyll, coriolus versicolor, couch grass, crampbark, dandelion root, dong quai, elecampane, evening primrose, eyebright, false unicorn root, feverfew, garlic, ginger, gota kola, grape seed extract, green tea, gugulipid, hawthorn, hops, ivy, licorice, milk thistle, mint, mistletoe (American Asian and European varieties), motherwort, oats, osha, passion flower, parsley, pumpkin, pygeum, red clover, rosemary, sarsparilla, skullcap, stinging nettle, wild indigo, wild yam and yerba mansa. In addition, glucosamines and/or chondroitin can be added to any of the embodiments described herein. It should also be appreciated that the extracts and derivatives of herbs may be employed as well.

Furthermore omega fatty acids may be incorporated into the nutritional supplement as well. These omega fatty acids may include omega-3 and/or omega-6 fatty acids. The above, vitamins, minerals, herbs and fatty acids may be incorporated into the nutritional supplement at or below recommended daily maximum doses which may vary for the individual vitamin, herb, mineral or fatty acid contemplated, depending on the intended recipient, i.e. bird, animal, etc.

The nutritional supplement may be supplied in powdered form or liquid form. When supplied in powdered form, the supplement may be reconstituted using appropriate amounts of water. The supplement, or individual components of the supplement, such as the albumin, may also be pasteurized.

The nutritional supplement may be added as a sauce or coating on food substrate, including, for example, bird feed, dog food or cat food. The supplement may be applied by the manufacturer, supplier or consumer to the food, chew or treat.

Alternatively, the nutritional supplement may be added into animal food, chews or treats. For example, the nutritional supplement may act as a carrier for the additives and be dispersed in a resin. The resin may be a starch, polymeric, casein, gluten, comminuted rawhide, collagen or animal protein. Gluten may be a water-insoluble protein complex extracted from cereal grains and may include corn or wheat gluten.

The resin may be combined with water and formed into a desired shape. For example, the resin may be present between about 60-99% and any incremental value or range therebetween and the nutritional supplement may be present between about 1-40% and any incremental value or range therebetween. It should be appreciated however, that greater amounts of the nutritional supplement may be present as well, such as up to 60%.

The nutritional supplement may be incorporated into the resin during any compounding step including, melt mixing, extrusion or injection molding, or post molding in either powdered or liquid form. It should be appreciated however, that it may be necessary to temper the albumin prior to adding the albumin directly to a hot substance, such as a liquid, i.e. water or digest, or a resin composition that is greater than approximately 60 degrees C. By tempering it is meant that the albumin in the nutritional supplement may be warmed slowly so as to prevent the albumin from curdling.

In an exemplary embodiment the nutritional supplement may be incorporated into a starch resin. The starch may include any carbohydrate of natural or vegetable origin. The starch may include amylose and/or amylopectin and may be extracted from plants, including but not limited to potatoes, rice, tapioca, corn and cereals such as rye, wheat, and oats. The starch may be present in the resin between about 30-99% including all increments and values therebetween such as levels above about 50%, 85%, etc.

The starch employed herein may be raw starch, which may be understood as starch that has not seen a prior thermal molding history, such as extrusion or other type of melt processing step. The raw starch itself may also be native, which may be understood as unmodified starch recovered in the original form by extraction and not physically or chemically modified. The raw starch may also be in powder form of varying particle size, which may be understood as milled and/or pre-sifted. It should be understood that the raw starch may also have varying degrees of moisture present.

The resin may include cellulose. The cellulose may be, for example, a long-chain polymer of polysaccharide carbohydrate. The cellulose may also be derived or extracted from plants. The cellulose may be incorporated into the resin between about 1-15% by weight of the resin and any increment or value therebetween including 4%, 10%, 11%, etc.

Emulsifiers or surfactants may also be incorporated into the resin. The emulsifier may be present between about 1-10% by weight of the resin and all increments or values therebetween including 3%, 4%, etc. The emulsifier may include, for example, lecithin, which may be extracted or derived from, for example, egg yolk or soy beans.

The resin may also include a plasticizer. The plasticizer may include for example, glycerin. The plasticizer may be incorporated between about 15-30%, including all increments and values therebetween such as levels greater than 15%, 21%, 27% etc.

A humectant may also be incorporated into the resin. The humectant may include, for example, oat fiber. The humectant may be incorporated between about 0.1-5% by weight of the resin including all intervals and values therebetween, including 1%, 25%, etc. A humectant may be understood to be any additive that may absorb water in the material.

Water may also be combined with the resin. The water may be introduced into the resin between about 1-40% by weight of the resin and any increment or value therebetween, including 4%, 20-40%, 10-20%, etc. After the product has been formed, the water may be present between 1-20% by weight of the resin including all increments or values therebetween, such as, below 20%, 4%, 5-10%, etc.

The resin, nutritional supplement and water may be introduced into an extruder. The extruder may be either a twin screw or single screw extruder. The water may be introduced between 20-40% by weight. During the extrusion process, the water may be vented from the extruder to reduce the amount of water present in the extrudate resin composition. Accordingly, the extruder may be provided with a vented barrel including vent ports. The extrudate resin composition may then be cooled and/or pelletized.

This composition may then be injection molded and formed into a desired shape. The water present in the resin may be reduced to at or below 20% and any incremental value or range between 1%-20%. To accommodate reduction of the water, the injection molding machine barrel and/or mold may be vented as well. It should be appreciated that the nutritional supplement may be added to the resin during the injection molding step as an alternative or in combination with adding the nutritional supplement to the resin during extrusion.

It should also be appreciated that the resin, water and nutritional supplement may be combined and formed during the injection molding process without previously extruding the resin. Accordingly, the resin, water and nutritional supplement may be added directly into the barrel of an injection molding machine where it is combined and formed into a desired shape. The water may be added to the injection molding machine between 20-40% by weight and reduced to at or below 20% and any incremental value or range between 1%-20%. The barrel and/or the mold may be vented.

The foregoing description is provided to illustrate and explain the present invention. However, the description hereinabove should not be considered to limit the scope of the invention set forth in the claims appended here to.

What is claimed is:

1. A method of forming a nutritional for an animal comprising:
    tempering albumin, wherein said albumin includes egg whites;
    providing said albumin as a carrier for an additive, wherein said additive includes an enzyme or coenzyme;
    combining said albumin and said additive to form a nutritional supplement;
    providing a resin composition at a temperature of greater than or equal to 60° C.;
    combining said nutritional supplement and said resin composition;
    forming said resin composition and nutritional supplement into a desired shape.

2. The method of claim 1 wherein said resin is selected from the group consisting of starch, gluten, polymeric resin, casein, comminuted rawhide, collagen, protein or combinations thereof.

3. The method of claim 1 wherein said additive is selected from the group consisting of vitamins, minerals, herbs and combinations thereof.

4. The method of claim 1 wherein said additive comprises an omega fatty acid.

5. The method of claim 1 wherein said additive comprises a flavorant or attractant.

6. The method of claim 1 wherein said additive comprises a fermented soy nutraceutical.

7. The method of claim 1 wherein said additive comprises a yeast product.

8. The method of claim 1 wherein said additive comprises a digest.

9. The method of claim 1 wherein said digest comprises hydrolyzed liver.

10. The method of claim 1 wherein said resin composition includes a resin additive selected from the group consisting of cellulose, emulsifiers, plasticizer, humectant and combinations thereof.

* * * * *